US010740914B2

United States Patent
Xiao et al.

(10) Patent No.: US 10,740,914 B2
(45) Date of Patent: Aug. 11, 2020

(54) ENHANCED THREE-DIMENSIONAL TRAINING DATA GENERATION

(71) Applicant: Pony AI Inc., Grand Cayman (KY)

(72) Inventors: Bo Xiao, San Jose, CA (US); Yiming Liu, San Jose, CA (US); Sinan Xiao, Mountain View, CA (US); Xiang Yu, Santa Clara, CA (US); Tiancheng Lou, Milpitas, CA (US); Jun Peng, Fremont, CA (US); Jie Hou, Fremont, CA (US); Zhuo Zhang, Fremont, CA (US); Hao Song, Sunnyvale, CA (US)

(73) Assignee: Pony AI Inc., Grand Cayman (KY)

( * ) Notice: Subject to any disclaimer, the term of this patent is extended or adjusted under 35 U.S.C. 154(b) by 186 days.

(21) Appl. No.: 15/949,928

(22) Filed: Apr. 10, 2018

(65) Prior Publication Data

US 2019/0311487 A1 Oct. 10, 2019

(51) Int. Cl.
| | | |
|---|---|---|
| *G06T 7/521* | (2017.01) | |
| *G06K 9/00* | (2006.01) | |
| *G06T 17/05* | (2011.01) | |
| *G01S 17/08* | (2006.01) | |
| *G01S 7/48* | (2006.01) | |
| *G01S 17/86* | (2020.01) | |

(52) U.S. Cl.
CPC ............ *G06T 7/521* (2017.01); *G01S 7/4802* (2013.01); *G01S 17/08* (2013.01); *G01S 17/86* (2020.01); *G06K 9/00805* (2013.01); *G06T 17/05* (2013.01); *G06T 2207/10028* (2013.01); *G06T 2207/20081* (2013.01); *G06T 2207/30261* (2013.01)

(58) Field of Classification Search
None
See application file for complete search history.

(56) References Cited

U.S. PATENT DOCUMENTS

| | | |
|---|---|---|
| 2018/0089563 A1 | 3/2018 | Redding et al. |
| 2018/0268256 A1* | 9/2018 | Di Febbo ................ G06T 7/246 |
| 2018/0330149 A1* | 11/2018 | Uhlenbrock ........ G06K 9/00214 |
| 2019/0072959 A1 | 3/2019 | Palanisamy et al. |
| 2019/0072973 A1 | 3/2019 | Sun et al. |
| 2019/0129436 A1 | 5/2019 | Sun et al. |
| 2019/0156485 A1* | 5/2019 | Pfeiffer .............. G06K 9/00791 |
| 2019/0272671 A1* | 9/2019 | Zhang .................... G06T 17/00 |

\* cited by examiner

*Primary Examiner* — Fayyaz Alam
(74) *Attorney, Agent, or Firm* — Sheppard Mullin Richter & Hampton LLP (57) ABSTRACT

Systems, methods, and non-transitory computer readable media configured to generate enhanced three-dimensional information. Three-dimensional information of a scene may be obtained. The three-dimensional information may define a three-dimensional point cloud model of the scene. The three-dimensional information may be determined based on distances of the scene from a location. Image information may be obtained. The image information may define one or more images of an object. The object may be identified based on the image information. A three-dimensional point cloud model of the object may be obtained. Enhanced three-dimensional information of the scene may be generated by inserting the three-dimensional point cloud model of the object into the three-dimensional point cloud model of the scene.

20 Claims, 6 Drawing Sheets

ENHANCED THREE-DIMENSIONAL TRAINING DATA GENERATION

FIELD OF THE INVENTION

This disclosure relates to approaches for generating enhanced three-dimensional training data.

BACKGROUND

Under conventional approaches, three-dimensional training data may be generated based on observations of distances to objects (e.g., measurements of a scene using LIDAR). Three-dimensional training data may be used to train tools to identify objects and/or behavior of objects. For example, LIDAR data may be used by a detection software to identify objects. However, observations of distances to objects may be imprecise and/or inaccurate. For instance, LIDAR data for a scene may include errors due to faulty LIDAR readings. Additionally, physical observations of objects within scenes may not include observations of particular objects/scenes. Training of tools using such data may lead to inaccurate detection of objects by the tools.

SUMMARY

Various embodiments of the present disclosure may include systems, methods, and non-transitory computer readable media configured to obtain three-dimensional information of a scene. The three-dimensional information may define a three-dimensional point cloud model of the scene. The three-dimensional information may be determined based on distances of the scene from a location. Image information may be obtained. The image information may define one or more images of an object. The object may be identified based on the image information. A three-dimensional point cloud model of the object may be obtained. Enhanced three-dimensional information of the scene may be generated by inserting the three-dimensional point cloud model of the object into the three-dimensional point cloud model of the scene.

In some embodiments, the enhanced three-dimensional information of the scene may be used to train a machine learning model. For example, the enhanced three-dimensional information of the scene may be used to train a machine learning model used to control motions of a vehicle.

In some embodiments, the distances of the scene from the location may be measured using LIDAR, and the image information may be captured by one or more image capture devices concurrently with the measurements of the distances of the scene using LIDAR.

In some embodiments, the objects may include a person, an animal, a vehicle, or a structure.

In some embodiments, inserting the three-dimensional point cloud model of the object into the three-dimensional point cloud model of the scene may include identifying a portion of the three-dimensional point cloud model of the scene corresponding to the object, and replacing the portion of the three-dimensional point cloud model of the scene with the three-dimensional point cloud model of the object.

In some embodiments, a point density of the three-dimensional point cloud model of the object inserted into the three-dimensional point cloud model of the scene may be determine based on a given distance of the object from the location.

In some embodiments, the three-dimensional point cloud model of the object may be inserted into the three-dimensional point cloud model of the scene based on an orientation of the object within the scene.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

A claimed solution rooted in computer technology overcomes problems specifically arising in the realm of computer technology. In various implementations, a computing system may obtain three-dimensional information of a scene. The three-dimensional information may define a three-dimensional point cloud model of the scene. The three-dimensional information may be determined based on distances of the scene from a location, such as distances measured using LIDAR from the location within the scene. Image information may be obtained. The image information may define one or more images of an object, such an object within the scene or an object to be simulated within the scene. The object (e.g., a person, an animal, a vehicle, a structure) may be identified based on the image information. A three-dimensional point cloud model of the object may be obtained. Enhanced three-dimensional information of the scene may be generated by inserting the three-dimensional point cloud model of the object into the three-dimensional point cloud model of the scene.

In some embodiments, the image information may be captured by one or more image capturing devices concurrently with the measurements of the distances of the scene using LIDAR.

In some embodiments, the enhanced three-dimensional information of the scene may be used to train one or more machine learning models. For example, the enhanced three-dimensional information of the scene may be used to train a machine learning model used to control motions of a vehicle.

In some embodiments, inserting the three-dimensional point cloud model of the object into the three-dimensional point cloud model of the scene may include identifying and replacing a portion of the three-dimensional point cloud model of the scene corresponding to the object with the three-dimensional point cloud model of the object.

In some embodiments, a point density of the three-dimensional point cloud model of the object inserted into the three-dimensional point cloud model of the scene may be determine based on a given distance of the object from the location. Such determination of the point density may provide for change in the point density to mimic how the object would be observed in real life (e.g., lower point density when the object is located further away from the LIDAR; higher point density when the object is located closer to the LIDAR).

In some embodiments, the three-dimensional point cloud model of the object may be inserted into the three-dimensional point cloud model of the scene based on an orientation of the object within the scene. That is, the orientation of the object within the scene may be determined to figure out in what orientation the three-dimensional point cloud model of the object may be inserted into the three-dimensional point cloud model of the scene.

The approaches disclosed herein enables generation of enhanced three-dimensional information (e.g., three-dimensional training data). The enhanced three-dimensional information may include higher fidelity data of a scene than three-dimensional information that simply includes an observed three-dimensional point cloud model of the scene. That is, the enhanced three-dimensional information may include a three-dimensional point cloud model of the scene that has been enhanced with higher fidelity point cloud model(s) of one or more objects within the scene. The enhanced three-dimensional information may include a simulated three-dimensional point cloud model of the scene that is different from an observed three-dimensional point cloud model of the scene. That is, the enhanced three-dimensional information may include a three-dimensional point cloud model of the scene that has been enhanced with three-dimensional point cloud model(s) of object(s) that are simulated to be within the scene.

While the disclosure is described herein with respect to vehicles on the road, this is merely for illustrative purposes and is not meant to be limiting. The approach disclosed herein may be used to generate enhanced three-dimensional information of other scenes including other objects.

Figure 1:
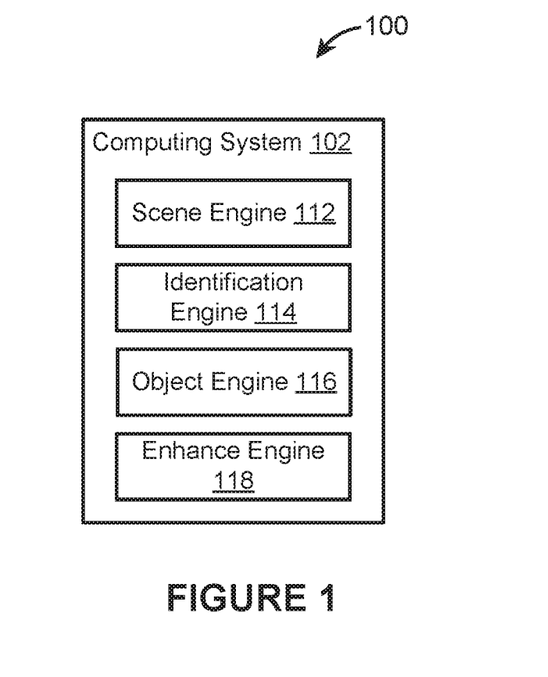
FIG. 1 illustrates an example environment for generating enhanced three-dimensional information, in accordance with various embodiments.

FIG. 1 illustrates an example environment 100 for generating enhanced three-dimensional information, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., stored in the memory of the computing system 102, coupled to the computing system, accessible via one or more network(s)). In some embodiments, the datastore(s) may include various databases, application functionalities, application/data packages, and/or other data that are available for download, installation, and/or execution.

In various embodiments, the computing system 102 may include a scene engine 112, an identification engine 114, an object engine 116, an enhance engine 118, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices.

In various embodiments, the scene engine 112 may be configured to obtain three-dimensional information of a scene. Obtaining three-dimensional information may include accessing, acquiring, analyzing, determining, examining, identifying, loading, locating, opening, receiving, retrieving, reviewing, storing, and/or otherwise obtaining the three-dimensional information. Three-dimensional information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Three-dimensional information may be stored within a single file or across multiple files. For example, three-dimensional information of a scene may have been ingested into a database as one or more objects, and the scene engine 112 may retrieve the object(s) to obtain the three-dimensional information.

Three-dimensional information of a scene may define a three-dimensional point cloud model of the scene. A scene may refer to a place or an area. A three-dimensional point cloud model of a scene may include one or more sets of data points in a coordinate system, such as Cartesian coordinate system, polar coordinate system, cylindrical coordinate system, spherical coordinate system, and/or other coordinate systems. The location of the data points within the coordinate system may represent positions of one or more objects in the scene. The location of the data points within the coordinate system may represent shapes, dimensions, and/or other physical characteristics of objects in the scene. For example, different data points may represent external surfaces of one or more objects located within the scene. A three-dimensional point cloud model of a scene may be used to determine/identify where object(s) are located within the scene.

Three-dimensional information may be determined based on distances of the scene from a location. Distances of the scene from a location may refer to measurements of how far object(s) within the scene are located from the location. Object(s) within a scene may include living object and/or non-living objects. Object(s) within the scene may include static/non-moving objects and/or dynamic/moving objects. For example, three-dimensional information may be determined based on distances of the scene measured using LIDAR from a location within the scene. For instance, three-dimensional information of a scene including a road may be determined based on LIDAR readings taken from a location on the road or a location off the road. The LIDAR readings may provide measurements of where objects within the scene, such as person(s), animal(s), vehicle(s), and/or structure(s), are located. That is, distances to objects within the scene may be measured using LIDAR to determine a map (e.g., high precision map) of the scene. Use of other techniques to measure distances of the scene are contemplated. In some embodiments, the distance measurements of a scene may be taken when moving objects are not present or not moving. For example, LIDAR may be used to map out a scene (e.g., roadway) during nighttime when moving objects (e.g., vehicles) are not present or not moving to obtain a pure background LIDAR dataset of the scene.

In various embodiments, the identification engine 114 may be configured to identify one or more objects. The object(s) may be identified by the engine 114 for insertion into three-dimensional information of a scene obtained by the scene engine 112. Objects identified by the identification engine 114 may include living object and/or non-living objects, such as person(s), animal(s), vehicle(s), structure(s), and/or other objects. Object(s) identified by the identification engine 114 may include static/non-moving objects and/or dynamic/moving objects. In some embodiments, the identification engine 114 may identify one or more objects based on one or more users' selection of the object(s). For instance, a user may use one or more interfaces (e.g., application programming interfaces, user interfaces) to select a particular object for insertion into three-dimensional information of a scene. In some embodiments, the identification engine 114 may identify one or more objects based on one or more images including the object(s). For instance, the identification engine 114 may obtain image information that defines one or more images of an object, and the object may be identified by the identification engine 114 based on the image information using one or more image/object recognition techniques. Alternative, or in addition, one or more objects in an image may be associated or labeled with information that identifies the object(s) and the object(s) may be identified based on such information. In some embodiments, the identification engine 114 may identify one or more objects based on analysis of the three-dimensional information. For instance, the identification engine 114 may analyze the three-dimensional information to identify objects that were part of the scene. Such identification of object(s) may include varying probabilities of identification. That is, based on the accuracy of the three-dimensional information, object(s) within the scene may be identified with varying degrees of accuracy. The identification of objects by the identification engine 114 may be confirmed by one or more users.

Identification of object(s) by the identification engine 114 may include general identification and/or specific identification. General identification may refer to identification of one or more main features of an object, such as a type of an object (e.g., person vs vehicle). Specific identification may refer to identification of specific features of an object, such as distinguishing features of an object. For instance, an object identified by the identification engine 114 may include a vehicle. The identification of the vehicle may include identification of the type of the vehicle (e.g., motorcycles, cars, trucks, buses) and/or identification of the specific features of the vehicle (e.g., year, make, model). Identification of other information about objects are contemplated.

The object(s) identified by the identification engine 114 may include object(s) present within the scene and/or object(s) not present within the scene. For example, the identification engine 114 may identify object(s) that were part of the scene when distance measurements (e.g., LIDAR data) for the scene were performed/obtained and/or may identify object(s) that were not part of the scene but are rather to be simulated to be within the scene. For instance, the image(s) used by the identification engine 114 may include images of the scene captured by one or more image capture devices concurrently with the measurements of the distances of the scene using LIDAR. The image(s) used by the identification engine 114 may include images that are captured in the same environment (e.g., driving environment) as the LIDAR data. The images may be used to provide for insertion of objects into three-dimensional information of a scene that are realistic.

In various embodiments, the object engine 116 may be configured to obtain one or more three-dimensional point cloud models of one or more objects. The object engine 116 may obtain three-dimensional point cloud model(s) of object(s) identified by the identification engine 114. Obtaining three-dimensional point cloud model(s) of object(s) may include accessing, acquiring, analyzing, determining, examining, identifying, loading, locating, opening, receiving, retrieving, reviewing, storing, and/or otherwise obtaining the three-dimensional point cloud model(s). Three-dimensional point cloud model(s) may be obtained from one or more storage locations (e.g., electronic storage located within the computing system 102, electronic storage coupled to the computing system 102, and/or electronic storage located remotely from the computing system 102. Three-dimensional point cloud model(s) may be stored within a single file or across multiple files. For example, three-dimensional point cloud model of an object may have been ingested into a database as one or more objects, and the object engine 116 may retrieve the object(s) to obtain the three-dimensional point cloud model of the object.

A three-dimensional point cloud model of an object may include one or more sets of data points in a coordinate system, such as Cartesian coordinate system, polar coordinate system, cylindrical coordinate system, spherical coordinate system, and/or other coordinate systems. The location of the data points within the coordinate system may represent shape, dimensions, and/or other physical characteristics of the object. For example, different data points may represent shape and/or dimensions of external surfaces the object.

In some embodiments, a three-dimensional point model of an object obtained by the object engine 116 may include a three-dimensional model of the object (e.g., stock three-dimensional model). For example, the object engine 116 may have access to three-dimensional models of objects stored in one or more storage locations, and the object engine 116 may find and retrieve a three-dimensional model of the object in the storage location(s) that corresponds to an object identified by the identification engine 114.

In some embodiments, the object engine 116 may generate a three-dimensional point model of an object. For example, the object engine 116 may obtain a three-dimensional model of an object identified by the identification engine 114 and generate a three-dimensional point model of the object using the three-dimensional model. A three-dimensional model of an object may represent the shape, dimensions, and/or other physical characteristics of the object using geometric entities, such as triangles, lines, curved surfaces, and/or other geometric entities. The object engine 116 may generate a three-dimensional point model of an object by placing data points along one or more portions of geometric entities. As another example, the object engine 116 may obtain a three-dimensional point model of a similar object and modify the three-dimensional point model to match the object identified by the identification engine 114. For instance, the object identified by the identification engine 114 may include a vehicle with custom parts, such as a vehicle with a custom tail fin. The object engine 116 may obtain a three-dimensional point model of the vehicle (e.g., stock three-dimensional model of the vehicle, three-dimensional point model of the vehicle generated using a three-dimensional model of the vehicle) and modify the three-dimensional point model to include the data points representing the custom tail fin. Other generations of three-dimensional point models of objects are contemplated.

In various embodiments, the enhance engine 118 may be configured to generate enhanced three-dimensional information of a scene. The enhance engine 118 may generate enhanced three-dimensional information of a scene based on three-dimensional information of the scene, three-dimensional point cloud model(s) of object(s), and/or other information. For example, the enhance engine 118 may generate enhanced three-dimensional information of a scene by inserting three-dimensional point cloud model(s) of object(s) into a three-dimensional point cloud model of a scene. That is, the enhance engine 118 may modify the three-dimensional point cloud model of the scene by inserting the three-dimensional point cloud model(s) of object(s) obtained by the object engine 116. Other combinations of three-dimensional information and three-dimensional point cloud model(s) of object(s) for generation of enhanced three-dimensional information are contemplated.

The enhanced three-dimensional information of the scene may define an enhanced three-dimensional point cloud model of the scene. The enhanced three-dimensional information of the scene may include and/or be associated with information that identifies one or more objects within the scene. For example, the enhanced three-dimensional information may include/be associated with label(s) that identify object(s) that were inserted into the three-dimensional point cloud model of the scene. For instance, the enhanced three-dimensional information may be generated based on insertion of a three-dimensional point cloud model of a vehicle into a three-dimensional point cloud model of the scene, and the three-dimensional point cloud model of the vehicle within the three-dimensional point cloud model of the scene may be labeled with information that identifies the vehicle, such as the year, make, and model the vehicle.

In some embodiments, the enhance engine 118 may insert a three-dimensional point cloud model of an object into a three-dimensional point cloud model of a scene by (1) identifying one or more portions of the three-dimensional point cloud model of the scene corresponding to the object, and (2) replacing the portion(s) of the three-dimensional point cloud model of the scene with the three-dimensional point cloud model of the object. For example, a three-dimensional point cloud model of a scene including a road may include a portion (set of data points) representing a vehicle on the road. The set of data points representing the vehicle may be of poor quality due to imperfect measurements of the scene by distance measurement techniques, such as LIDAR. For instance, the set of data points representing the vehicle may not include sufficient resolution/number of data points to represent certain features of the vehicle (e.g., missing data points for side view mirrors) and/or inaccurate LIDAR measurements may lead to inaccurate placement of data points, resulting in inaccurate representations of the vehicle shape and/or dimensions. The three-dimensional point cloud model of the object inserted into the three-dimensional point cloud model of the scene may be of higher fidelity (e.g., higher quality, higher resolution, more detailed, more accurate) than the portion of the three-dimensional point cloud model of the scene that represents the object. For example, the three-dimensional point cloud model of the object inserted into the three-dimensional point cloud model of the scene may more accurately represent the object (e.g., include higher resolution/number of data points, more accurately represent vehicle features) than the portion of the three-dimensional point cloud model of the scene that represents the object. Thus, enhanced three-dimensional information of the scene may include higher fidelity data of the scene than three-dimensional information that simply includes an observed three-dimensional point cloud model of the scene. That is, enhanced three-dimensional information of a scene may define a three-dimensional point cloud model of the scene that has been enhanced with higher fidelity point cloud model of an object within the scene. Enhanced three-dimensional information of a scene may include a combination of both observed three-dimensional point cloud data representing the scene and higher fidelity three-dimensional point cloud data representing the object.

In some embodiments, the enhance engine 118 may insert a three-dimensional point cloud model of an object that was not part of a scene into a three-dimensional point cloud model of the scene. The enhanced three-dimensional information may define a simulated three-dimensional point cloud model of the scene that is different from an observed three-dimensional point cloud model of the scene. The enhance engine 118 may generate a simulated three-dimensional point cloud model of the scene by inserting three-dimensional point cloud data that represents an object that was not part of the scene when distance measurements (e.g., LIDAR data) for the scene were performed/obtained. That is, the enhanced three-dimensional information may define a three-dimensional point cloud model of the scene that has been enhanced with three-dimensional point cloud model of an object that is simulated to be within the scene. Thus, the enhance engine 118 may create a three-dimensional point cloud model of a scene that was not physically observed. Such generation of enhanced three-dimensional information may allow for generation of variety of scenes without having to physically observe the scenes.

In some embodiments, the enhance engine 118 may change a three-dimensional point cloud model of an object before inserting it into a three-dimensional point cloud model of a scene. For example, a point density (resolution) of the three-dimensional point cloud model of the object may be changed based on where in the scene the object is placed. The point density of the three-dimensional point cloud model of the object may be determined based on how far from the location of distance measurement of the scene (e.g., where LIDAR equipment was located when distances of the scene were measured) the object is placed. The point density of the three-dimensional point cloud model of the object may be increased/reduced to mimic how the LIDAR data for the object may have been measured in real-life. For example, when the object is placed further away, the point density of the three-dimensional point cloud model of the object may be reduced. Such determination of the point density may provide for change in the point density to mimic how the object would be observed in real life (e.g., lower point density when the object is located further away from the LIDAR; higher point density when the object is located closer to the LIDAR).

The point density of a three-dimensional point cloud model of an object may be uniform or non-uniform. The point density of a three-dimensional point cloud model of an object inserted into a three-dimensional point cloud model of a scene may be the same throughout the three-dimensional point cloud model of the object. The point density of a three-dimensional point cloud model of an object inserted into a three-dimensional point cloud model of a scene may be different for different portions of the three-dimensional point cloud model of the object. For example, closer portions of the object may be represented with higher resolution data points while other portions of the object may be represented with lower resolution data points.

In some embodiments, the enhance engine 118 may insert a three-dimensional point cloud model of an object into a three-dimensional point cloud model of a scene based on an orientation of the object within the scene. That is, the enhance engine 118 may determine the orientation of the object within the scene to figure out in what orientation the three-dimensional point cloud model of the object may be inserted into the three-dimensional point cloud model of the scene. For example, a three-dimensional point cloud model of a vehicle to be inserted into a three-dimensional point cloud model of a scene including a road may be rotated, tilted, and/or otherwise oriented with respect to the road/ground. The orientation of the object within the scene may be determined based on distances to one or more objects/features within the scene. For example, the orientation of the vehicle on the road may be determined based on distances to the vehicle/portions of the vehicle, lanes, and/or other features of the road. As another example, the orientation of the vehicle on the road may be determined based on analysis of one or more image(s) captured at the scene. For instance, the orientation of the vehicle on the road may be determined based on how the vehicle appears (e.g., different perspective) within different images.

In some embodiments, enhanced three-dimensional information of a scene may be used to train one or more machine learning models. A machine learning model may refer to one or more model artifacts that is generated from machine learning training process. A machine learning model may facilitate one or more tools to learn with data without explicit programming. For example, a machine learning model may be used in one or more tools to control motions of a vehicle, and enhanced three-dimensional information of a scene may be used as training data to train the machine learning model. Such training of the machine learning model may enable the tool(s) to better control motions of the vehicle, such as by better identifying objects (e.g., obtained located on/along roads) and/or better controlling how the vehicle acts in response to identifying objects. Proper training of such machine learning models may require large amounts of training data, such as large amounts of three-dimensional information of different scenes. Physically observing different types of scenes may be difficult and time consuming. Rather than training the machine learning models strictly with observed three-dimensional information, training data that simulates real situations may be generated for use in training the machine learning models. Physically observed three-dimensional information may be of poor quality, such as due to imperfect measurements of the scene by distance measurement techniques. Physically observed three-dimensional information may be enhanced with higher fidelity data to more better represent objects within scenes.

Figure 2:
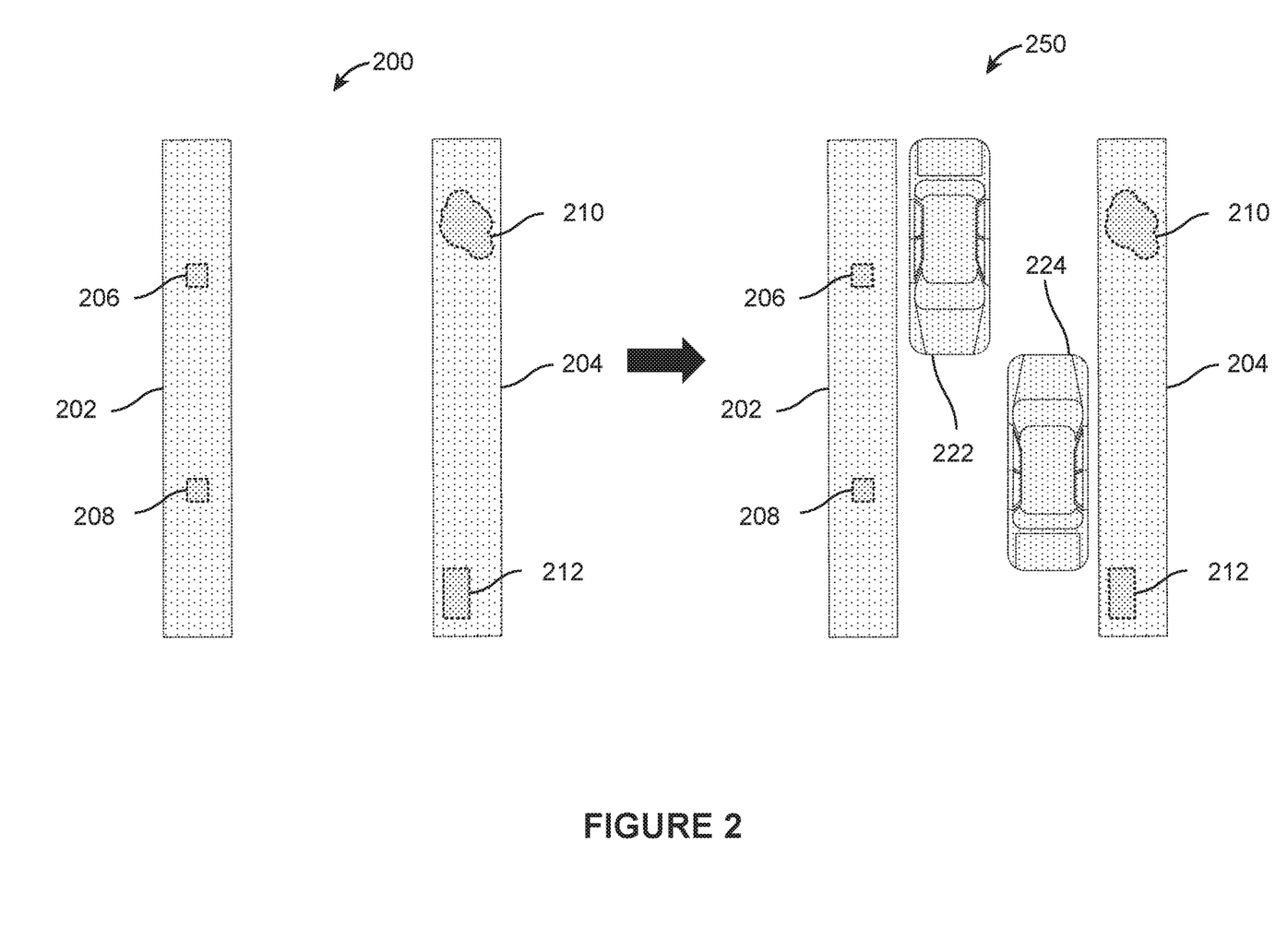
FIG. 2 illustrates an example insertion of three-dimensional point cloud models of objects into a three-dimensional point cloud model of a scene, in accordance with various embodiments.

FIG. 2 illustrates an example insertion of three-dimensional point cloud models of objects into a three-dimensional point cloud model of a scene, in accordance with various embodiments. A three-dimensional point cloud model 200 may include data points representing surfaces, shapes, dimensions, and/or other physical characteristics of objects located within a scene. For example, the scene may include a road with sidewalks (represented by data points 202, 204) on either side of the road. The sidewalk represented by the data points 202 may include structures (represented by data points 206, 208), such as columns and/or lamp posts, and the sidewalk represented by the data points 204 may include a tree (represented by data points 210) and a mailbox (represented by data points 212). Other objects and other scenes are contemplated. The scene may not include any vehicles. An enhanced three-dimensional point cloud model of the scene 250 may be generated based on insertion of three-dimensional point cloud models of vehicles. The enhanced three-dimensional point cloud model of the scene 250 may include data points 222, 224 representing vehicles which are simulated to be present within the scene. The data points 222, 224 representing the vehicles may be oriented within the enhanced three-dimensional point cloud model of the scene 250 based on the desired orientation of the vehicles. The enhanced three-dimensional point cloud model of the scene 250 may allow for training of one or more machine learning models without having to physically observe the simulated scene including the vehicles.

Figure 3:
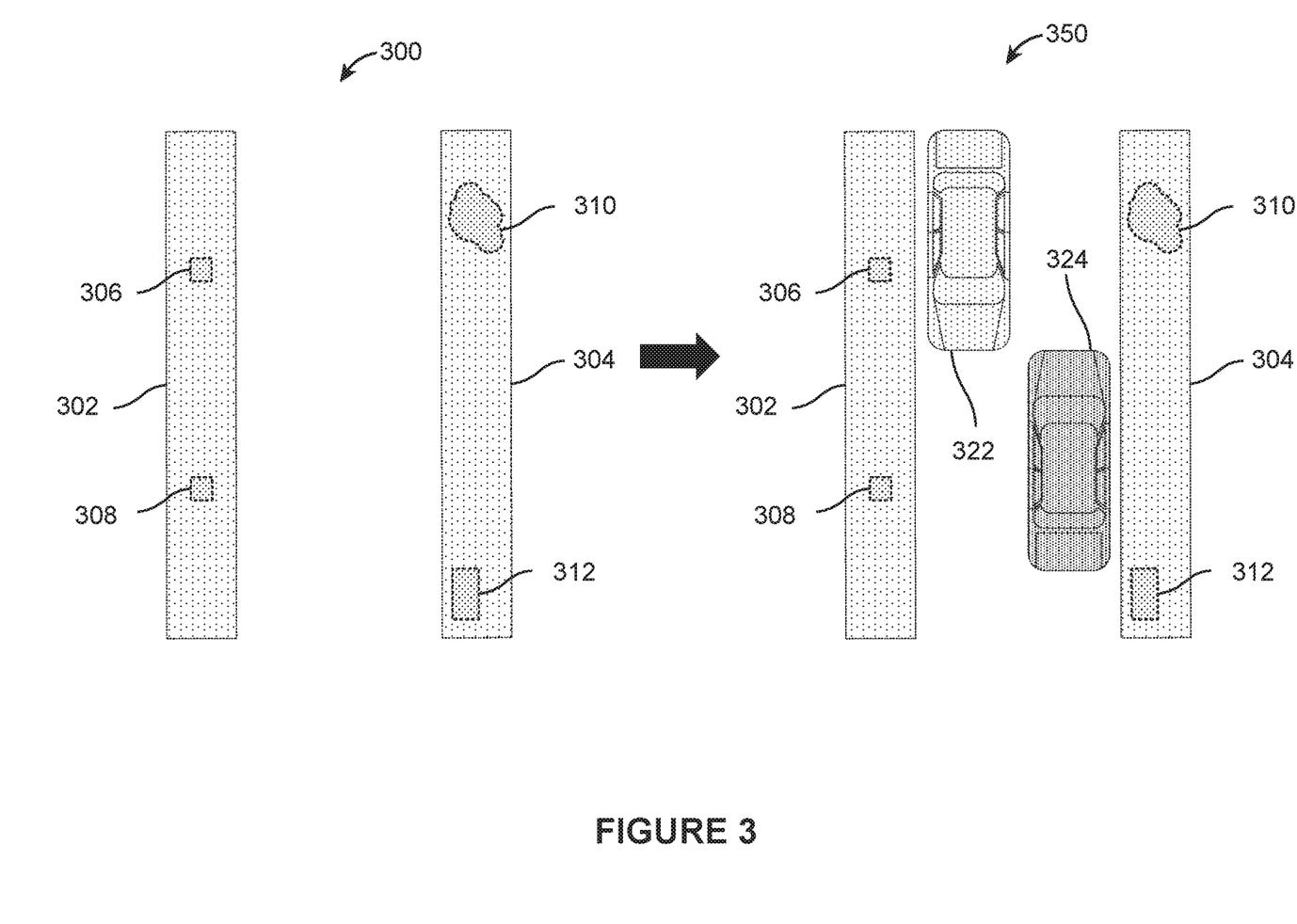
FIG. 3 illustrates an example insertion of three-dimensional point cloud models of objects into a three-dimensional point cloud model of a scene, in accordance with various embodiments.

FIG. 3 illustrates an example insertion of three-dimensional point cloud models of objects into a three-dimensional point cloud model of a scene, in accordance with various embodiments. A three-dimensional point cloud model 300 may include data points representing surfaces, shapes, dimensions, and/or other physical characteristics of objects located within a scene. For example, the scene may include a road with sidewalks (represented by data points 302, 304) on either side of the road. The sidewalk represented by the data points 302 may include structures (represented by data points 306, 308), such as columns and/or lamp posts, and the sidewalk represented by the data points 304 may include a tree (represented by data points 310) and a mailbox (represented by data points 312). Other objects and other scenes are contemplated. The scene may not include any vehicles. An enhanced three-dimensional point cloud model of the scene 350 may be generated based on insertion of three-dimensional point cloud models of vehicles. The enhanced three-dimensional point cloud model of the scene 350 may include data points 322, 324 representing vehicles which are simulated to be present within the scene. The data points 322 representing one of the vehicles may have a point density different from the data points 324 representing the other vehicle. For instance, the data points 324 representing one of the vehicles may have a higher point density than the data points 322 representing the other vehicle. The higher point density of the data points 324 may result in higher resolution data representation of the vehicle than the data points 322. The point density of the data points 322, 324 representing vehicles may be uniform or non-uniform. For example, the point density of the data points 324 inserted into the three-dimensional point cloud model of the scene 300 may be the same throughout the data points 324 or may be different for different portions of the data points 324. For instance, the data points 324 may include higher density for the back portion of the vehicle than the front portion of the vehicle.

Figure 4:
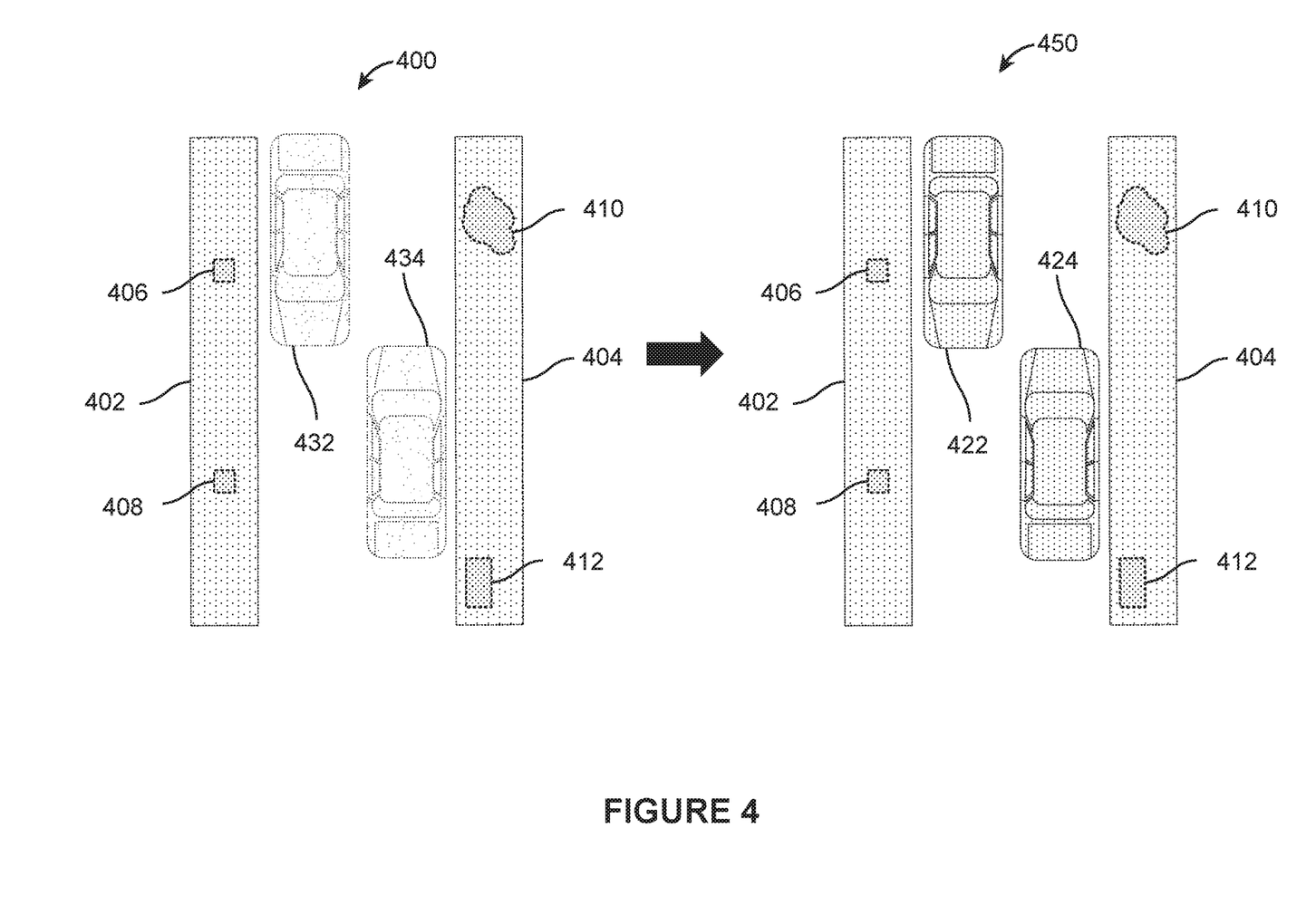
FIG. 4 illustrates an example insertion of three-dimensional point cloud models of objects into a three-dimensional point cloud model of a scene, in accordance with various embodiments.

FIG. 4 illustrates an example insertion of three-dimensional point cloud models of objects into a three-dimensional point cloud model of a scene, in accordance with various embodiments. A three-dimensional point cloud model 400 may include data points representing surfaces, shapes, dimensions, and/or other physical characteristics of objects located within a scene. For example, the scene may include a road with sidewalks (represented by data points 402, 404) on either side of the road. The sidewalk represented by the data points 402 may include structures (represented by data points 406, 408), such as columns and/or lamp posts, and the sidewalk represented by the data points 404 may include a tree (represented by data points 410) and a mailbox (represented by data points 412). The scene may include two vehicles, and the vehicles may be represented by data points 432, 434. Other objects and other scenes are contemplated.

The data points 432, 434 may be of poor quality due to imperfect measurements of the scene. For example, the data points 432, 434 may not include sufficient resolution/number of data points to represent certain features of the vehicles and/or inaccurate distance measurements may lead to inaccurate placement of data points, resulting in inaccurate representations of the vehicle shapes and/or dimensions. An enhanced three-dimensional point cloud model of the scene 450 may be generated based on insertion of three-dimensional point cloud models of the vehicles. The data points 432 may be replaced with data points 422 and the data points 434 may be replaced with data points 424. The data points 422, 424 inserted into the three-dimensional point cloud model of the scene 400 may be of higher fidelity than the data points 432, 434. The data points 422, 424 may more accurately represent the vehicles (e.g., include higher resolution/number of data points, more accurately represent vehicle features) than the data points 432, 434. The enhanced three-dimensional point cloud model of the scene 450 may include enhancement using higher fidelity data points 422, 424 of vehicles within the scene.

Figure 5:
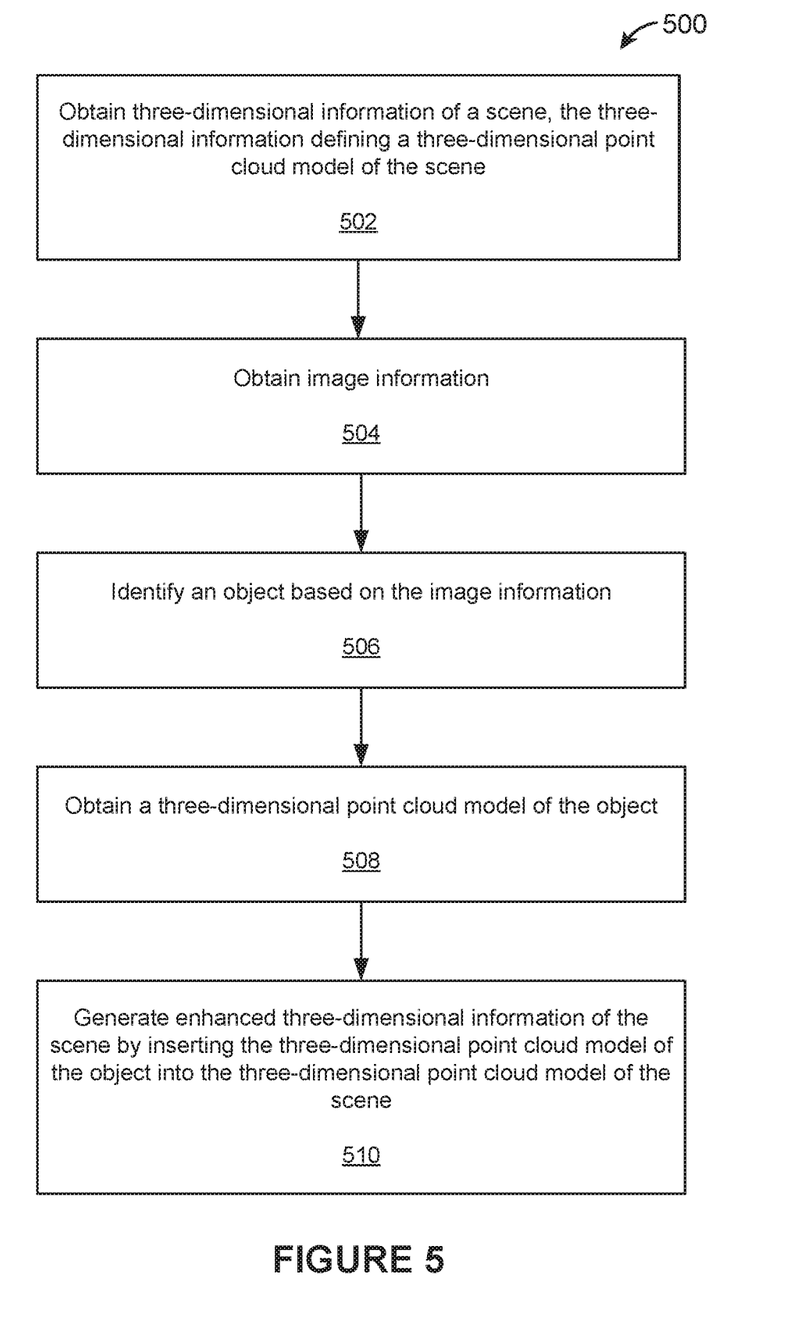
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, three-dimensional information of a scene may be obtained. The three-dimensional information may define a three-dimensional point cloud model of the scene. The three-dimensional information may be determined based on distances of the scene from a location. At block 504, image information may be obtained. The image information may define one or more images of an object. At block 506, the object may be identified based on the image information. At block 508, a three-dimensional point cloud model of the object may be obtained. At block 510, enhanced three-dimensional information of the scene may be generated by inserting the three-dimensional point cloud model of the object into the three-dimensional point cloud model of the scene.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
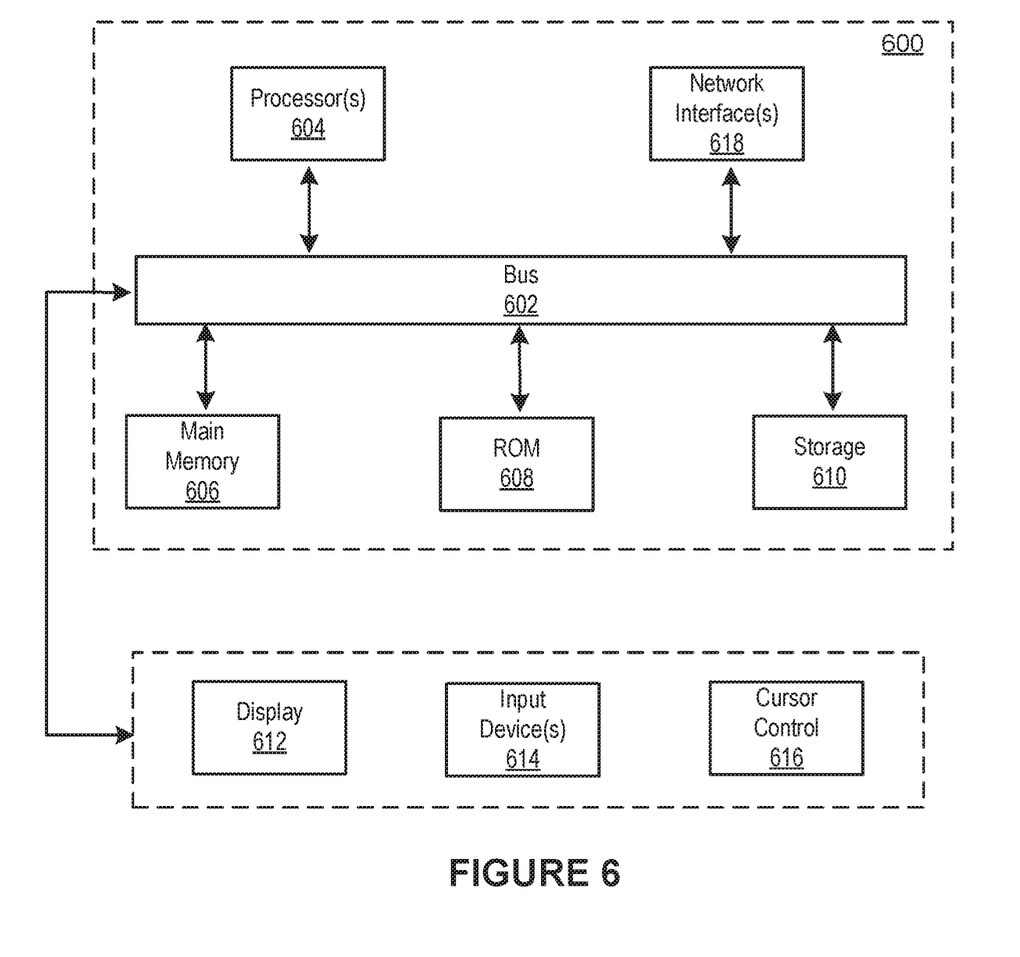
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
obtaining three-dimensional information of a scene, the three-dimensional information defining a three-dimensional point cloud model of the scene, the three-dimensional information determined based on distances of the scene from a location;
obtaining image information, the image information defining one or more images of an object;
identifying the object based on the image information;
obtaining a three-dimensional point cloud model of the object; and
generating enhanced three-dimensional information of the scene by inserting the three-dimensional point cloud model of the object into the three-dimensional point cloud model of the scene, wherein the inserting includes:
identifying a portion of the three-dimensional point cloud model of the scene corresponding to the object; and
replacing the portion of the three-dimensional point cloud model of the scene corresponding to the object with the three-dimensional point cloud model of the object.

2. The system of claim 1, wherein the enhanced three-dimensional information of the scene is used to train a machine learning model.

3. The system of claim 2, wherein the machine learning model is used to control motions of a vehicle.

4. The system of claim 1, wherein the distances of the scene from the location are measured using LIDAR.

5. The system of claim 4, wherein the image information is captured by one or more image capture devices concurrently with the measurements of the distances of the scene using LIDAR.

6. The system of claim 1, wherein the object includes a person, an animal, a vehicle, or a structure.

7. The system of claim 1, wherein a point density of the three-dimensional point cloud model of the object inserted into the three-dimensional point cloud model of the scene is determined based on a given distance of the object from the location.

8. The system of claim 1, wherein the three-dimensional point cloud model of the object is inserted into the three-dimensional point cloud model of the scene based on an orientation of the object within the scene.

9. A method implemented by a computing system including one or more processors and storage media storing machine-readable instructions, wherein the method is performed using the one or more processors, the method comprising:
obtaining three-dimensional information of a scene, the three-dimensional information defining a three-dimensional point cloud model of the scene, the three-dimensional information determined based on distances of the scene from a location;
obtaining image information, the image information defining one or more images of an object;
identifying the object based on the image information;
obtaining a three-dimensional point cloud model of the object; and
generating enhanced three-dimensional information of the scene by inserting the three-dimensional point cloud model of the object into the three-dimensional point cloud model of the scene, wherein the inserting includes:
identifying a portion of the three-dimensional point cloud model of the scene corresponding to the object; and
replacing the portion of the three-dimensional point cloud model of the scene corresponding to the object with the three-dimensional point cloud model of the object.

10. The method of claim 9, wherein the enhanced three-dimensional information of the scene is used to train a machine learning model.

11. The method of claim 10, wherein the machine learning model is used to control motions of a vehicle.

12. The method of claim 9, wherein the distances of the scene from the location are measured using LIDAR.

13. The method of claim 12, wherein the image information is captured by one or more image capture devices concurrently with the measurements of the distances of the scene using LIDAR.

14. The method of claim 9, wherein the object includes a person, an animal, a vehicle, or a structure.

15. The method of claim 9, wherein a point density of the three-dimensional point cloud model of the object inserted into the three-dimensional point cloud model of the scene is determine based on a given distance of the object from the location.

16. The method of claim 9, wherein the three-dimensional point cloud model of the object is inserted into the three-dimensional point cloud model of the scene based on an orientation of the object within the scene.

17. A non-transitory computer readable medium comprising instructions that, when executed, cause one or more processors to perform:
obtaining three-dimensional information of a scene, the three-dimensional information defining a three-dimensional point cloud model of the scene, the three-dimensional information determined based on distances of the scene from a location;
obtaining image information, the image information defining one or more images of an object;
identifying the object based on the image information;
obtaining a three-dimensional point cloud model of the object; and
generating enhanced three-dimensional information of the scene by inserting the three-dimensional point cloud model of the object into the three-dimensional point cloud model of the scene, wherein the inserting includes:
identifying a portion of the three-dimensional point cloud model of the scene corresponding to the object; and replacing the portion of the three-dimensional point cloud model of the scene corresponding to the object with the three-dimensional point cloud model of the object.

18. The non-transitory computer readable medium of claim 17, wherein a point density of the three-dimensional point cloud model of the object inserted into the three-dimensional point cloud model of the scene is determined based on a given distance of the object from the location.

19. The system of claim 1, wherein a point density of the three-dimensional point cloud model of the object is uniform.

20. The system of claim 1, wherein a point density of the three-dimensional point cloud model of the object is non-uniform with a first one or more portions of the object being represented with higher resolution data points in the three-dimensional point cloud model of the object and a second one or more portions of the object being represented with lower resolution data points in the three-dimensional point cloud model of the object.

\* \* \* \* \*